United States Patent
Nadeau

(10) Patent No.: US 11,025,524 B2
(45) Date of Patent: Jun. 1, 2021

(54) TELECOMMUNICATIONS NETWORK AND SERVICES QOE ASSESSMENT

(71) Applicant: EXFO Inc., Quebec (CA)

(72) Inventor: Sylvain Nadeau, Vaudreuil-Dorion (CA)

(73) Assignee: EXFO Inc., Quebec (CA)

( * ) Notice: Subject to any disclaimer, the term of this patent is extended or adjusted under 35 U.S.C. 154(b) by 37 days.

(21) Appl. No.: 16/543,803

(22) Filed: Aug. 19, 2019

(65) Prior Publication Data

US 2020/0059428 A1    Feb. 20, 2020

Related U.S. Application Data

(60) Provisional application No. 62/719,925, filed on Aug. 20, 2018, provisional application No. 62/867,347, filed on Jun. 27, 2019.

(30) Foreign Application Priority Data

Aug. 16, 2019   (EP) ..................................... 19192067

(51) Int. Cl.
*G06F 15/173*     (2006.01)
*H04L 12/26*     (2006.01)
*H04L 29/06*     (2006.01)

(52) U.S. Cl.
CPC .......... *H04L 43/50* (2013.01); *H04L 43/0888* (2013.01); *H04L 65/80* (2013.01); *H04L 69/163* (2013.01)

(58) Field of Classification Search
CPC ..... H04L 43/50; H04L 43/0888; H04L 65/80; H04L 69/163

USPC ......................................................... 709/224
See application file for complete search history.

(56) References Cited

U.S. PATENT DOCUMENTS

| | | |
|---|---|---|
| 7,274,670 B2 | 9/2007 | Hicks et al. |
| 7,430,179 B2 | 9/2008 | Towns-von Stauber et al. |
| 7,835,293 B2 | 11/2010 | Cidon et al. |
| 8,472,349 B1 | 6/2013 | Sun et al. |
| 8,880,689 B2 | 11/2014 | Yamanaka et al. |
| 8,892,731 B2 | 11/2014 | Oki et al. |
| 8,964,572 B2 | 2/2015 | Baykal et al. |
| 9,088,768 B1 | 7/2015 | Bordner-Babayigit et al. |

(Continued)

FOREIGN PATENT DOCUMENTS

| | | |
|---|---|---|
| EP | 3035597 A1 | 6/2016 |
| EP | 3322127 A1 | 5/2018 |

(Continued)

OTHER PUBLICATIONS

S. Khorsandroo, R. M. Noor and S. Khorsandroo, "Stimulus-centric versus perception-centric relations in quality of experience assessment," Wireless Telecommunications Symposium 2012, London, 2012, pp. 1-6, doi: 10.1109/WTS.2012.6266128. (Year: 2012).*

(Continued)

*Primary Examiner* — Melvin H Pollack
(74) *Attorney, Agent, or Firm* — Isabelle Chabot

(57) ABSTRACT

A telecommunications network and service QoE assessment method and system comprising calculating a service score; calculating a network score; calculating a global score by combining the service score and the network score, the global score being for a quality of experience of a user on the network.

20 Claims, 16 Drawing Sheets

(56) References Cited

U.S. PATENT DOCUMENTS

| | | | |
|---|---|---|---|
| 9,203,764 | B2 | 12/2015 | Shirazipour et al. |
| 9,210,714 | B2 | 12/2015 | Egner et al. |
| 9,230,314 | B2 | 1/2016 | Kitano |
| 9,313,671 | B2 * | 4/2016 | Yokoyama ............ H04W 24/02 |
| 9,326,182 | B2 | 4/2016 | Baillargeon |
| 9,413,848 | B2 | 8/2016 | Oki et al. |
| 9,667,744 | B2 | 5/2017 | Oki et al. |
| 9,769,033 | B2 | 9/2017 | Wang et al. |
| 9,769,051 | B2 * | 9/2017 | McCallen ............... H04L 43/50 |
| 9,794,554 | B1 * | 10/2017 | Le Callet ........... G06K 9/00711 |
| 9,807,592 | B2 | 10/2017 | Ramamurthi et al. |
| 9,813,523 | B2 | 11/2017 | Bar Bracha et al. |
| 9,838,892 | B2 | 12/2017 | Yamanaka et al. |
| 9,853,867 | B2 * | 12/2017 | Baccarani ........... H04L 41/5003 |
| 10,079,734 | B1 | 9/2018 | Gegout et al. |
| 10,169,931 | B2 * | 1/2019 | Remboski .............. G07C 5/008 |
| 10,218,590 | B2 * | 2/2019 | Gupta ................... H04L 67/141 |
| 10,244,418 | B2 * | 3/2019 | Gordon ................ H04W 24/08 |
| 10,320,869 | B2 | 6/2019 | Lohmar et al. |
| 10,321,361 | B2 * | 6/2019 | Senarath ............. H04W 72/087 |
| 10,326,848 | B2 * | 6/2019 | Nath ........................ H04L 67/22 |
| 10,362,081 | B2 * | 7/2019 | Parthasarathy ........ H04N 21/24 |
| 10,383,002 | B2 * | 8/2019 | Striegel ............... H04L 43/0882 |
| 10,439,920 | B2 * | 10/2019 | McCallen ........... H04L 43/0852 |
| 10,454,989 | B2 * | 10/2019 | Ouyang .............. H04L 41/5067 |
| 10,506,014 | B2 * | 12/2019 | Spilka ...................... H04L 65/80 |
| 10,523,534 | B2 * | 12/2019 | Park ........................ H04L 43/08 |
| 10,542,446 | B2 * | 1/2020 | Ketonen ............... H04W 24/04 |
| 10,613,958 | B2 * | 4/2020 | Grinkemeyer ........ H04L 63/029 |
| 10,623,280 | B2 * | 4/2020 | Smith ..................... H04L 43/50 |
| 10,666,529 | B2 * | 5/2020 | Lundberg .............. H04L 41/147 |
| 10,708,978 | B2 * | 7/2020 | Le ........................... H04L 45/22 |
| 10,764,348 | B2 * | 9/2020 | Singh ............... H04W 72/1231 |
| 10,771,833 | B2 * | 9/2020 | Arye ....................... H04L 47/27 |
| 10,827,371 | B2 * | 11/2020 | Chow ................... H04W 24/08 |
| 2007/0250625 | A1 | 10/2007 | Titus |
| 2013/0290525 | A1 | 10/2013 | Fedor et al. |
| 2016/0050589 | A1 | 2/2016 | Safavi |
| 2016/0105821 | A1 | 4/2016 | Senarath |
| 2016/0352924 | A1 | 12/2016 | Senarath et al. |
| 2016/0373510 | A1 | 12/2016 | Sreevalsan et al. |
| 2017/0048297 | A1 | 2/2017 | Funge et al. |
| 2017/0244614 | A1 | 8/2017 | Wu et al. |
| 2017/0289047 | A1 | 10/2017 | Szilagyi et al. |
| 2017/0302539 | A1 | 10/2017 | Park et al. |
| 2017/0317894 | A1 | 11/2017 | Dao et al. |
| 2017/0373950 | A1 * | 12/2017 | Szilagyi ................. H04L 43/00 |
| 2018/0062943 | A1 * | 3/2018 | Djukic ................ H04L 41/5009 |
| 2018/0365581 | A1 * | 12/2018 | Vasseur ................... H04L 41/16 |
| 2018/0375753 | A1 * | 12/2018 | Mirsky ................... H04L 43/50 |
| 2019/0296997 | A1 * | 9/2019 | Menon ................ H04L 43/0864 |
| 2019/0372857 | A1 * | 12/2019 | Gandhi ................... H04L 41/12 |
| 2020/0044946 | A1 * | 2/2020 | Park ........................ H04L 41/00 |
| 2020/0059428 | A1 * | 2/2020 | Nadeau ............... H04L 43/0888 |
| 2020/0092184 | A1 * | 3/2020 | Park .................... H04L 41/5038 |
| 2020/0322826 | A1 * | 10/2020 | Wangler ............... H04W 24/08 |

FOREIGN PATENT DOCUMENTS

| | | | |
|---|---|---|---|
| WO | 2017176247 | A1 | 10/2017 |
| WO | WO-2017211169 | A1 * | 12/2017 |

OTHER PUBLICATIONS

S. Egger, P. Reichl, T. Hoßfeld and R. Schatz, ""Time is bandwidth"? Narrowing the gap between subjective time perception and Quality of Experience," 2012 IEEE International Conference on Communications (ICC), Ottawa, ON, 2012, pp. 1325-1330, doi: 10.1109/ICC.2012.6363769. (Year: 2012).*

Nasir, Muhammad Umar. "Monitoring Network Congestion in Wi-Fi, based on QoE in HTTP Video Steaming Services," LUND University Libraries, LUP Student Papers, Dept of Electrical and Information Technology, EITM02 20151, Aug. 17, 2016. (Year: 2016).*

D. Minovski, C. Ahlund, K. Mitra and P. Johansson, "Analysis and Estimation ofVideo QoE in Wireless Cellular Networks using Machine Learning," 2019 Eleventh International Conference on Quality of Multimedia Experience (QoMEX), Berlin, Germany, 2019, pp. 1-6, doi: 10.1109/QOMEX.2019.8743281. (Year: 2019).*

P. Racz, D. Dbnni and B. Stiller, "An architecture and implementation for IP Network and Service Quality Measurements," 2010 IEEE Network Operations and Management Symposium—NOMS 2010, Osaka, 2010, pp. 24-31, doi: 10.1109/NOMS .2010.5488429. (Year: 2010).*

Constantine, B. et al. "Framework for TCP Throughput Testing," RFC 6349, Aug. 2011. (Year: 2011).*

Hedayat, K. et al. "A Two Way Active Measurement Protocol (TWAMP)," RFC 5357, Oct. 2008. (Year: 2008).*

Hedin, J. et al. "Differentiated Service Code Point and Explicit Congestion Control Notification Monitoring in the Two Way Active Measurement Protocol (TWAMP)," RFC 7750, Feb. 2016. (Year: 2016).*

Casas et al., YOUQMON: a system for on-line monitoring of YouTube QoE in operational 3G networks, ACM SIGMETRICS Performance Evaluation Review 41, No. 2: 44-46, Aug. 27, 2013.

Schatz et al., Vienna surfing: assessing mobile broadband quality in the field, Proceedings of the first ACM SIGCOMM workshop on Measurements up the stack, pp. 19-24, Aug. 19, 2011.

Streijl et al., Mean opinion score (MOS) revisited: methods and applications, limitations and alternatives, Multimedia Systems 22, No. 2: 213-227, Mar. 1, 2016.

Lai et al., A buffer-aware HTTP live streaming approach for SDN-enabled 5G wireless networks, IEEE network 29, No. 1:49-55, Jan. 2015.

Fiedler et al., A generic quantitative relationship between quality of experience and quality of service, IEEE Network 24, No. 2: 36-41, Mar. 2010.

Takahashi et al., Perceptual QoS assessment technologies for VoIP, IEEE Communications Magazine 42, No. 7: 28-34, Jul. 2004.

ITU-T, Series G: Transmission Systems and Media, Digital Systems and Networks; Multimedia Quality of Service and performance—Generic and user-related aspects; Opinion model for video-telephony applications, G.1070, Jul. 2012.

ITU-T, Series G: Transmission Systems and Media, Digital Systems and Networks; International telephone connections and circuits—Transmission planning and the E-model; The E-model: a computational model for use in transmission planning, G.107, Feb. 2014.

Tsolkas et al., A Survey on Parametric QoE Estimation for Popular Services, Journal of Network and Computer Applications, Jan. 2017.

SpeedTest by Ookla, Reports—United States, Mobile, Jul. 18, 2018. https://www.speedtest.net/reports/united-states/2018/#mobile, available on Jun. 25, 2019.

SpeedTest by Ookla, Reports—United States, Fixed, Dec. 12, 2018. https://www.speedtest.net/reports/united-states/2018/#fixed, available on Jun. 25, 2019.

SpeedTest by Ookla, Reports—United Kingdom, Mobile, Jan. 30, 2018. https://www.speedtest.net/reports/united-kingdom/#mobile, available on Jun. 25, 2019.

SpeedTest by Ookla, Reports—United Kingdom, Fixed, Jan. 30, 2018. https://www.speedtest.net/reports/united-kingdom/#fixed, available on Jun. 25, 2019.

SpeedTest by Ookla, Reports—Canada, Mobile, Sep. 19, 2018. https://www.speedtest.net/reports/canada/#mobile, available on Jun. 25, 2019.

SpeedTest by Ookla, Reports—Canada, Fixed, Sep. 19, 2018. https://www.speedtest.net/reports/canada/#fixed, available on Jun. 25, 2019.

Netflix, How we calculate the rankings, ISP Speed Index, https://ispspeedindex.netflix.com/about/, available on Jun. 25, 2019.

Wang et al., A Study on QoS/QoE Correlation Model in Wireless-network, IEEE Signal and Information Processing Association Annual Summit and Conference (APSIPA), 2014 Asia-Pacific.

(56) References Cited

OTHER PUBLICATIONS

Mitra et al., Context-Aware QoE Modelling, Measurement and Prediction in Mobile Computing Systems, IEEE Transactions on Mobile Computing, DOI 10.1109/TMC.2013.155, 2013 IEEE.

Menkovski et al., Predicting Quality of Experience in Multimedia Streaming, MoMM2009 Proceedings of the 7th International Conference on Advances in Mobile Computing and Multimedia, Dec. 14, 2009.

Viavi Revolutionizes IT Troubleshooting with Industry-First End-User Experience Score, Oct. 2, 2018. https://www.viavisolutions.com/fr-fr/node/60903, available on Oct. 29, 2018.

European Telecommunications Standards Institute, Speech and multimedia Transmission Quality (STQ); Best practices for robust network QoS benchmark testing and ranking, vol. WG STQ Mobile STQ Mobile, No. V0.0.2, Jun. 8, 2018, pp. 1-20, XPO14312531.

International Telecommunication Union, Draft New Recommendation "Statistical Framework for QoE Centric Benchmarking Scoring and Ranking", ITU-T Draft, Study Period 2017-2020; Study group 12, Series TD438, Apr. 4, 2018, p. 1-15, XPO44244248.

\* cited by examiner

```
const bDScorePenalty = 0.1 * (1 - this.clipValue(bDRatio, 0, 1));
const tcpEffScorePenalty = 0.1 * (1 - this.clipValue(tcpEffRatio, 0, 1));
const tcpTraScore = 1 - Math.sqrt(1 - Math.pow(this.clipValue(tcpTraRatio, 0, 1), 2));
const score = this.clipValue(5 * (tcpTraScore - bDScorePenalty - tcpEffScorePenalty), 0, 5);
```

Figure 3

```
const bDScorePenalty = 0.1 * (1 - this.clipValue(bDRatio, 0, 1));
const tcpEffScorePenalty = 0.1 * (1 - this.clipValue(tcpEffRatio, 0, 1));
const score = this.clipValue(5 * (tcpTraRatio - bDScorePenalty - tcpEffScorePenalty), 0, 5);
```

Figure 4

```
const downloadScore = this.calculateDownloadScoreForTimeWindow(group, internetPackages);
const uploadScore = this.calculateUploadScoreForTimeWindow(group, internetPackages);
return Math.min(downloadScore, uploadScore);
```

Figure 5

```
const NAMin = 1 - (nbNetworkDown/group.length);
const NAMax = 1 - (this.TestDurationSec/this.TestIntervalSec) * (nbNetworkDown/group.length);
const NAEst = NAMin + (NAMax - NAMin) * Math.pow(1 - ((nbNetworkDown - 1)/group.length), 100);
```

Figure 7

```
const lossRatio = this.clipValue(Math.max(lossIn, lossOut) / 100, 0, 1);
const jitterPenalty = 0.1 * (this.clipValue((Math.max(jitterIn, jitterOut) -
this.LatencyMaxMs) / this.LatencyMaxMs), 0, 1));
const lossScore = this.clipValue(5 * ((1 - Math.sqrt(1 - Math.pow(1 - lossRatio, 2))) -
jitterPenalty), 0, 5);
```

Figure 8

```
const twampResult.score = Math.min(lossScore, networkAvailabilityStar);
if (twampResult) {
    speedtestRes.score = Math.min(speedtestRes.score, twampResult.score);
}
```

Figure 9

```
const networkRes = this.findNetworkResultForDate(networkResults, rfc6349Res.date);
if (networkRes) {
    networkRes.score = Math.min(networkRes.score, rfc6349Res.score);
} else {
    scores.push(rfc6349Res);
}
```

Figure 10

TELECOMMUNICATIONS NETWORK AND SERVICES QOE ASSESSMENT

CROSS-REFERENCE TO RELATED APPLICATIONS

This application claims priority under 35 U.S.C. § 119(e) of and hereby incorporates by reference the specifications of U.S. provisional patent application Ser. Nos. 62/719,925 filed Aug. 20, 2018 and 62/867,347 filed Jun. 27, 2019 and claims priority under 35 U.S.C. § 119(a) of and hereby incorporates by reference the specification of EP patent application number EP19192067 filed Aug. 16, 2019.

TECHNICAL FIELD

The invention relates to a telecommunications quality of experience assessment. More particularly, it relates to a service and network global quality of experience assessment.

BACKGROUND

In the telecommunications industry, the degree of delight or annoyance of a user of an application or service is referred to as the "Quality of Experience" (QoE). A "QoE assessment" is the process of measuring or estimating the QoE for a set of users of an application or a service with a dedicated procedure and considering the influencing factors. Several techniques of QoE assessment exist such as the widely used Mean Opinion Score (MOS). There are also many techniques of QoE estimations based on Major Configuration Parameters (MCPs) and Key Performance Indicators (KPIs).

The QoE estimation models are typically defined for and applicable to a specific application. For example, the Telecommunication Standardization Sector of the International Telecommunications Union (ITU-T) defines QoE assessment methods for Voice Over Internet Protocol (VoIP) and online video. There are also multiple QoE estimation models in the literature for FTP, web browsing, video streaming, messaging, etc. These prior art QoE estimations require visibility on the type of services being used in order to assess the QoE score with the corresponding model. They also need specific MCP and KPIs.

QoE assessment is also relevant for fixed broadband and mobile network connections. For example, Speedtest.net provides a Speed Score per Internet Service Provider (ISP) or mobile operator (see https://www.speedtest.net/reports/ available on Aug. 8, 2019). This score is calculated per region from tests run over a certain period of time. The score is based on the download (90%) and upload (10%) speeds from a modified trimean. Another example is Netflix™, which provides a ranking of ISPs based on the average prime time bitrate for Netflix™ content stream speed at all available end user devices (see https://ispspeedindex.netflix.com/about/ available on Aug. 8, 2019).

There are problems and drawbacks with prior art methods for QoE assessment. Issues include:

The QoE assessment provided for network performance only considers the connection speed (upload and download) and disregards the variability of the network connection performance over time or the network availability (downtime).

The QoE assessment for service performance is only provided per service type and requires service monitoring or emulation.

There is there a need for a QoE assessment method combining network and services performance into a single score since both performance aspects affect the experience of the user at once.

SUMMARY

A major aspect of the current invention is that it provides a network and service assessment method comprising calculating a service score; calculating a network score; and calculating a global score using the service score and the network score.

In one embodiment, the global score is calculated using a minimum of the service score and the network score.

In one embodiment, the service score, the network score and the global score are each provided as an integer between 0 and 5 and labelled respectively service five-star rating, network five-star rating and global five-star rating.

According to one broad aspect of the present disclosure, there is provided a non-transitory computer-readable storage medium having computer readable code stored thereon for programming a network and service assessment system to perform the steps of: obtaining service test result data from one or more active tests on a network; processing the service test result data to calculate a service score; obtaining network test result data from one or more network availability tests on the network; processing the network test result data to calculate a network score; processing the service score and the network score to calculate a global score for a quality of experience of a user on the network; and causing a user interface to report at least the global score.

In one embodiment, the service score, the network score and the global score are each provided as numerical values between 0 and 5 and labelled respectively service five-star score, network five-star score and global five-star score and wherein a 0 value is labelled "Non-functional", a 1 value is labelled "Bad", a 2 value is labelled "Poor", a 3 value is labelled "Fair", a 4 value is labelled "Good" and a 5 value is labelled "Excellent".

In one embodiment, the global score (5SS) is calculated by: 5SS=min [5SSS, 5SSN] where 5SSS is the service score; 5SSN is the network score.

In one embodiment, the active test is a TCP Throughput test and wherein the service test result data is TCP Throughput test results and wherein the TCP Throughput test is a RFC6349 test.

In one embodiment, the service score (5SSS) is calculated by:

$$5SSS = 5 * \begin{bmatrix} (1 - \sqrt{1 - tcp\_tra\_ratio^2}) - \\ 0.1 * (1 - bd\_ratio) - \\ 0.1 * (1 - tcp\_eff\_ratio) \end{bmatrix}$$

where TCP transfer ratio:

$$tcp\_tra\_ratio = \frac{actual\_rate}{ideal\_rate};$$

Buffer delay ratio:

$$bd\_ratio = \frac{rtt - brtt}{brtt};$$

TCP efficiency ratio:

$$tcp\_eff\_ratio = \frac{tx\_bytes - retx\_bytes}{tx\_bytes};$$

ideal_rate is a rate required by a most demanding service to test; actual_rate is a measured TCP rate; rtt is a round-trip time measured during the TCP Throughput test; brtt is a round-trip time inherent to a network path under non-congested conditions; tx_bytes is a number of bytes transmitted during the TCP Throughput test, said tx_bytes being a total of a number of original bytes and a number of retransmitted bytes; retx_bytes is the number of retransmitted bytes during the TCP Throughput test.

In one embodiment, the network availability test is at least one of a speed test and a connection availability test and wherein the network score (5SSN) is calculated using network test result data obtained from the speed test and the connection availability test.

In one embodiment, the network score (5SSN) is calculated by performing the speed test at a first frequency and performing the connection availability test at a second frequency, wherein the second frequency is greater than the first frequency and wherein the network test result data includes historical data for instances of the speed test and connection availability test.

In one embodiment, the speed test is a TCP Speed test and the connection availability test is a TWAMP test and wherein the network test result data includes download speed, upload speed and ping data obtained from the TCP speed test and includes latency, jitter and loss data obtained from the TWAMP test.

In one embodiment, the network score (5SSN) is calculated by: 5SSN=min [5SSN_TP, 5SSN_NA, 5SSN_TM] where 5SSN_TP is a speed network score calculated using network test result data obtained from the TCP speed test; 5SSN_NA is a Network Availability network score calculated using network test result data obtained from the TWAMP test; and 5SSN_TM is a Loss and Latency network score calculated using network test result data obtained from the TWAMP test.

In one embodiment, the TCP Speed test includes an upload TCP Speed test and a download TCP Speed test and processing the network test result data includes calculating a TCP network score which includes an upload TCP network score and a download TCP network score and wherein the upload TCP network score and the download TCP network score are calculated using a TCP transfer ratio, a Buffer delay ratio and a TCP efficiency ratio.

In one embodiment, the speed network score (5SSN_TP) is calculated from an upload speed network score (5SSN_TP$_{UL}$) and a download speed network score (5SSN_TP$_{DL}$) by:

$$5SSN\_TP = \min[5SSN\_TP_{UL}, 5SSN\_TP_{DL}] \text{ where}$$

$$5SSN\_TP_{UL} = 5 * \left[\frac{tcp\_tra\_ratio - 0.1 * (1 - bd\_ratio) -}{0.1 * (1 - tcp\_eff\_ratio)}\right];$$

$$5SSN\_TP_{DL} = 5 * \left[\frac{tcp\_tra\_ratio - 0.1 * (1 - bd\_ratio) -}{0.1 * (1 - tcp\_eff\_ratio)}\right];$$

$$tcp_{tra_{ratio}} = \frac{actual_{rate}}{ideal_{rate}};$$

-continued $$bd\_ratio = \frac{rtt - brtt}{brtt};$$

$$tcp\_eff\_ratio = \frac{tx\_bytes - retx\_bytes}{tx\_bytes};$$

ideal_rate is a rate required by the most demanding service to test; actual_rate is a measured TCP rate; rtt is a round-trip time measured during the TCP Throughput test; brtt is a round-trip time inherent to the network path under non-congested conditions; tx_bytes is a number of bytes transmitted during the TCP Throughput test (total of original and the retransmitted); retx_bytes is the number of retransmitted bytes during the TCP Throughput test.

In one embodiment, calculating the Network Availability network score (5SSN_NA) includes calculating an estimated network availability NA$_{est}$ from a minimum network availability NA$_{min}$ and maximum network availability NA$_{max}$ by:

$$NA_{est} = NA_{min} + (NA_{max} - NA_{min}) * (1 - P(X \leq x)) \text{ where}$$

$$NA_{min} = 1 - \frac{nb\_test\_100\%\_loss}{nb\_test};$$

$$NA_{max} = 1 - mon\_ratio * \frac{nb\_test\_100\%\_loss}{nb\_test};$$

$$mon\_ratio = \frac{test\_duration}{test\_interval};$$

nb_test_100%_loss is a number of TWAMP tests with 100% of packet loss; nb_test is a number of TWAMP tests during the reference period; test_duration is a duration of a TWAMP test; test_interval is a time between the execution of consecutive TWAMP tests;

$$P(X \leq x) = 1 - e^{-\lambda x}, \lambda = 1/6, x = \frac{nb\_test\_100\%\_loss}{nb\_test}.$$

In one embodiment, the Network Availability network score (5SSN_NA) is given by:

$$5SSN\_NA = \begin{cases} 5, \text{ if } NA_{est} \geq 99.999\% \\ 4, \text{ if } NA_{est} \geq 99.99\% \\ 3, \text{ if } NA_{est} \geq 99.9\% \\ 2, \text{ if } NA_{est} \geq 99\% \\ 1, \text{ if } NA_{est} \geq 90\% \\ 0, \text{ if } NA_{est} < 90\% \end{cases}.$$

In one embodiment, the Loss and Latency network score (5SSN_TM) is calculated by:

$$5SSN\_TM = 5 * \left[\left(1 - \sqrt{1 - (1 - loss\_ratio)^2}\right) - 0.1 * \left(1 - \frac{latency - latency_{th}}{latency_{th}}\right)\right]$$

where loss_ratio is a maximum of an outbound and inbound packet loss on a number of transmitted packets; latency is a maximum of an outbound round-trip latency and an inbound round-trip latency; latency$_{th}$ is a latency threshold used to apply a penalty on the network score.

According to another broad aspect of the present disclosure, there is provided a network and service assessment system comprising: a network interface communicatively coupled to one or more test clients each comprising a test server and a processing device, to test a network with the test server; a processor communicatively coupled to the network interface and configured to receive test results from the one or more test clients; memory storing instructions that, when executed, cause the processor to: obtain test results, via the network interface, from the one or more test clients from the test of the network; execute a network and service QoE assessment test module for automated post-processing on the test results to calculate a service score, a network score and a global score, the global score being calculated from the service score and the network score; and cause a user interface to report at least the global score.

BRIEF DESCRIPTION OF THE DRAWINGS

Having thus generally described the nature of the invention, reference will now be made to the accompanying drawings, showing by way of illustration example embodiments thereof, in which like reference numbers are used to denote like system components/method steps, as appropriate, and in which:

FIG. 3 shows an example source code with implementation considerations of Equation 1 for the five-star score for services performance;

FIG. 4 shows an example source code with implementation considerations of Equation 2 for the five-star score for the network throughput performance;

FIG. 5 shows an example source code with implementation considerations of Equation 3 for the five-star score for the network throughput performance;

FIG. 7 shows an example source code with implementation considerations of Equation 4, Equation 5 and Equation 6 for the network availability estimation;

FIG. 8 shows an example source code with implementation considerations of Equation 7 for the five-star score for network performance related to TWAMP metrics;

FIG. 9 shows an example source code with implementation considerations of Equation 8 for the five-star score for network performance;

FIG. 10 shows an example source code with implementation considerations of Equation 9 for the global five-star score;

DETAILED DESCRIPTION

Figure 1:
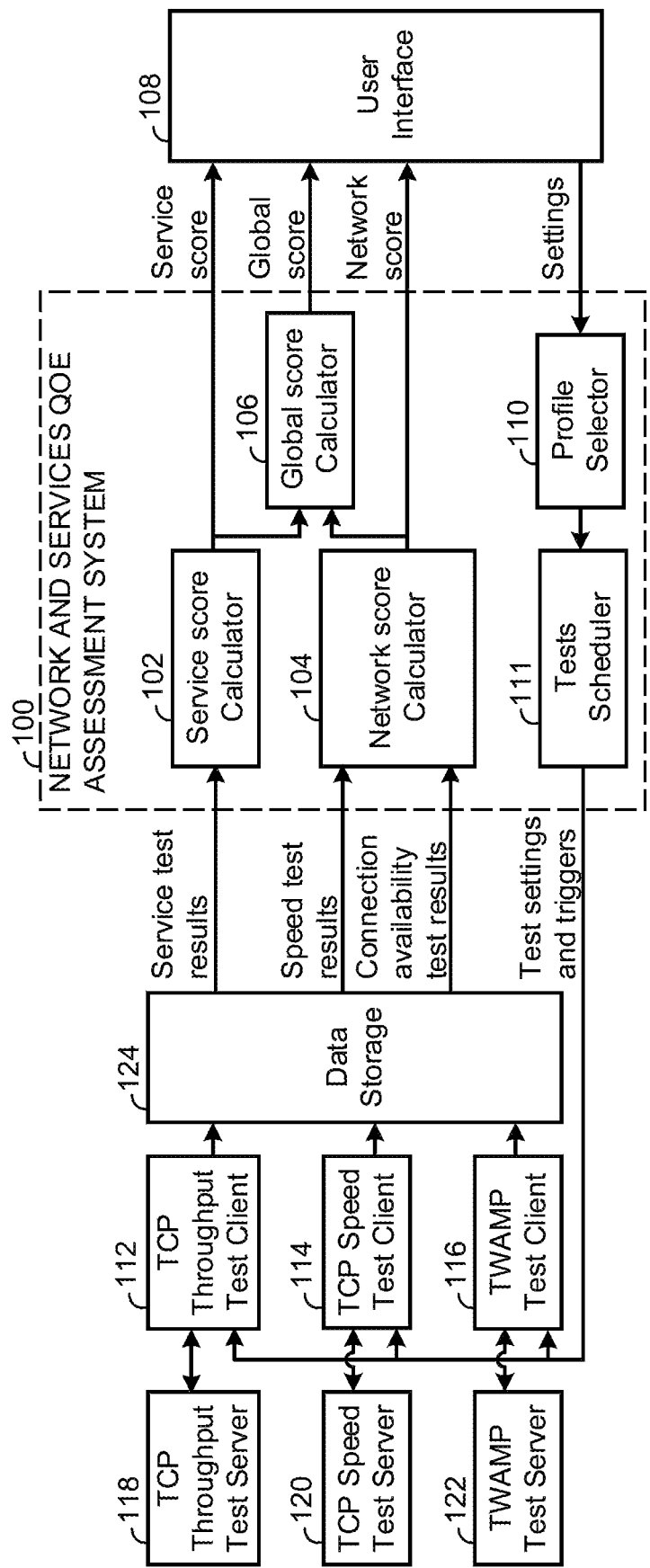
FIG. 1 is a block diagram showing the main components of a system for network and service QoE assessment.

QoE assessments are carried out for the network performance, services performance and the global performance (combined network and services performance). The QoE assessments are compiled from the results of active tests. The active tests include throughput tests, speed tests and connectivity tests. The present QoE assessments can therefore be defined as objective QoE estimations with an evaluation method based on the injection of test signals (active testing, intrusive testing or synthetic traffic testing).

Service Testing Methodology

Services typically run over the TCP or UDP transport layers—layer 4 of the Open Systems Interconnection (OSI) model (User Datagram Protocol (UDP) and Transmission Control Protocol (TCP) layers). It is believed that performing active testing at the transport layer provides the proper KPIs to estimate the QoE of the services running over it. Thus, by running a service test, such as one built on the RFC 6349 framework for TCP Throughput testing for TCP and the Y.1564 Ethernet service activation test methodology for UDP, there is no need to emulate each service individually to qualify them. Moreover, performing active testing allows for the discovery of potential problems before starting to use a service.

Network Testing Methodology

Performing a speed test, such as a TCP speed test (i.e. the Ookla™ speed test), provides the proper KPIs to estimate the QoE of a fixed broadband and mobile network connection. Running periodic speed tests gives measurements of upload and download capacity at different points in time. The speed test history allows to highlight potential problems as a function of the time of day and day of week (e.g. degraded performance on Friday evenings). The speed test may represent a significant amount of data transfer when executed multiple times per day. To limit the impact on bandwidth utilization, a second type of test is used to monitor the connection availability (detect and measure downtime). An example connection availability test is the Two-Way Active Measurement Protocol (TWAMP) Test and can be based on the RFC 5357 TWAMP test. This provides a continuous monitoring of access (every 30 seconds, for example) while speed tests are typically only run a few times a day (every 3 hours, for example). Other low bandwidth active tests, such as periodic ping tests for example, could alternatively or additionally be used to monitor the network availability.

Quality of Experience Assessment with Score

A five-star concept is used to abstract the numerous measurement results to provide an accessible QoE score for the network performance, services performance and global performance.

The five-star score ranges from 0 to 5 (decimal values are possible) with the following descriptors: 0 Non-functional, 1 Bad, 2 Poor, 3 Fair, 4 Good, 5 Excellent. The score value can also be presented as a percentage number (i.e. 5 is 100%) or with a visual representation using pictograms or color (e.g. red for 0, green for excellent and shades of orange and yellow in between).

Some advantages of this invention are the following:

A) Includes multiple measurement points distributed over time which averages variation while emphasizing critical events (e.g. downtime);

B) Provides a QoE score combining network and services performance assessments in addition to individual scores;

C) Includes network availability in QoE assessment;

D) Uses a five-star score concept to make the score easy to understand for the user with little to no interpretation necessary.

Now referring to FIG. 1, the network and services QoE assessment system 100 includes a Service Score Calculator 102, a Network Score Calculator 104 and a Global Score Calculator 106. They respectively produce the service, network and global scores, which could be presented on a User Interface 108. The system 100 also includes a Profile Selector 110 to determine the test parameters corresponding to the targeted service type. The Test Scheduler 111 periodically triggers, according to their individual periodicity, the test clients for the chosen tests to initiate tests with their paired server. In one embodiment, the test clients may be the TCP Throughput Test Client 112, TCP Speed Test Client 114 and the TWAMP Test Client 116 and they initiate tests with their paired server, the TCP Throughput Test Server 118, the TCP Speed Test Server 120 and the TWAMP Test Server 122, respectively. The tests results are sent to the Data Storage 124 which provides them to the Service Score Calculator 102, the Network Score Calculator 104 and the Global Score Calculator 106 to calculate the service, network and global scores.

In FIG. 1, the Network and Services QoE Assessment system 100 is a processing unit which includes at least functional components 102, 104, 106, 110, 111. Functional components 102, 104, 106, 110, 111 can be software instructions executed on the processing unit for automated assessment. The processing unit can be a digital device that, in terms of hardware architecture, generally includes a processor, input/output (I/O) interfaces including user interface 108, a network interface, a data store including data storage 124, and memory. The processing unit can be one or multiple virtual instances running over a virtualization layer abstracting computing resources. It should be appreciated by those of ordinary skill in the art that FIG. 1 depicts the processing unit in an oversimplified manner, and a practical embodiment may include additional components and suitably configured processing logic to support known or conventional operating features that are not described in detail herein. Also, the processing device can be a stand-alone server, group of servers, etc. for executing the QoE assessment.

When the processing unit is a digital device, the components (102, 104, 106, 108, 110, 111, 124) are communicatively coupled via a local interface. The local interface can be, for example, but not limited to, one or more buses or other wired or wireless connections, as is known in the art. The local interface can have additional elements, which are omitted for simplicity, such as controllers, buffers (caches), drivers, repeaters, and receivers, among many others, to enable communications. Further, the local interface may include address, control, and/or data connections to enable appropriate communications among the components.

The network interface may be used to enable the processing device to communicate on a network, such as the Internet. The network interface may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface may include address, control, and/or data connections to enable appropriate communications on the network.

A processor is used as a hardware device for executing software instructions within processing device 100. The processor can be any custom made or commercially available processor, a central processing unit (CPU), an auxiliary processor among several processors associated with the processing device, a semiconductor-based microprocessor (in the form of a microchip or chip set), or generally any device for executing software instructions. When the processing device is in operation, the processor is configured to execute software stored within the memory, to communicate data to and from the memory, and to generally control operations of the processing device pursuant to the software instructions. In an exemplary embodiment, the processor may include a mobile-optimized processor such as optimized for power consumption and mobile applications.

The I/O interfaces, including user interface 108 can be used to receive user input from and/or for providing system output. User input can be provided via, for example, a keypad, a touch screen, a scroll ball, a scroll bar, buttons, and the like. System output can be provided via a display device such as a liquid crystal display (LCD), touch screen, and the like. System output may also be provided via a display device and a printer. The I/O interfaces can also include, for example, a serial port, a parallel port, a small computer system interface (SCSI), an infrared (IR) interface, a radio frequency (RF) interface, a universal serial bus (USB) interface, and the like. The I/O interfaces can include a graphical user interface (GUI) that enables a user to interact with the processing device 100.

The data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another but can be accessed by the processor.

The software in memory can include one or more software programs, each of which includes an ordered listing of executable instructions for implementing logical functions. In the example of FIG. 1, the software in the memory includes a suitable operating system (O/S) and programs. The operating system essentially controls the execution of other computer programs and provides scheduling, input-output control, file and data management, memory management, and communication control and related services. The programs may include various applications, add-ons, etc. configured to provide end-user functionality with the processing device.

The processing device can be incorporated in a test equipment or in communication with a test equipment. The test equipment can include different physical media test modules. The physical media test modules include ports and connectors to interface to networks for testing. In an embodiment, a mobile device can execute an application which communicates with the test equipment. The mobile device can communicate with the test equipment via Bluetooth, Wi-Fi, wired Ethernet, USB, via combinations, or the like. The mobile device is configured to communicate to the Internet via cellular, Wi-Fi, etc.

Still referring to FIG. 1, when the processing unit is running over a virtualization layer, the components (102, 104, 106, 108, 110, 111, 124) are run inside one or multiple virtual machine or container instances. When distributed over multiple instances, the components are exchanging information between themselves typically via a bridge network. The bridge network can be, for example, but not limited to, a virtual switch. Some of the components (102, 104, 111) are also communicating on a network, such as the Internet. In this case, a virtual NIC is associated to each virtual machine while the containers are connected to the bridge network of the host system providing access to the network.

Figure 2:
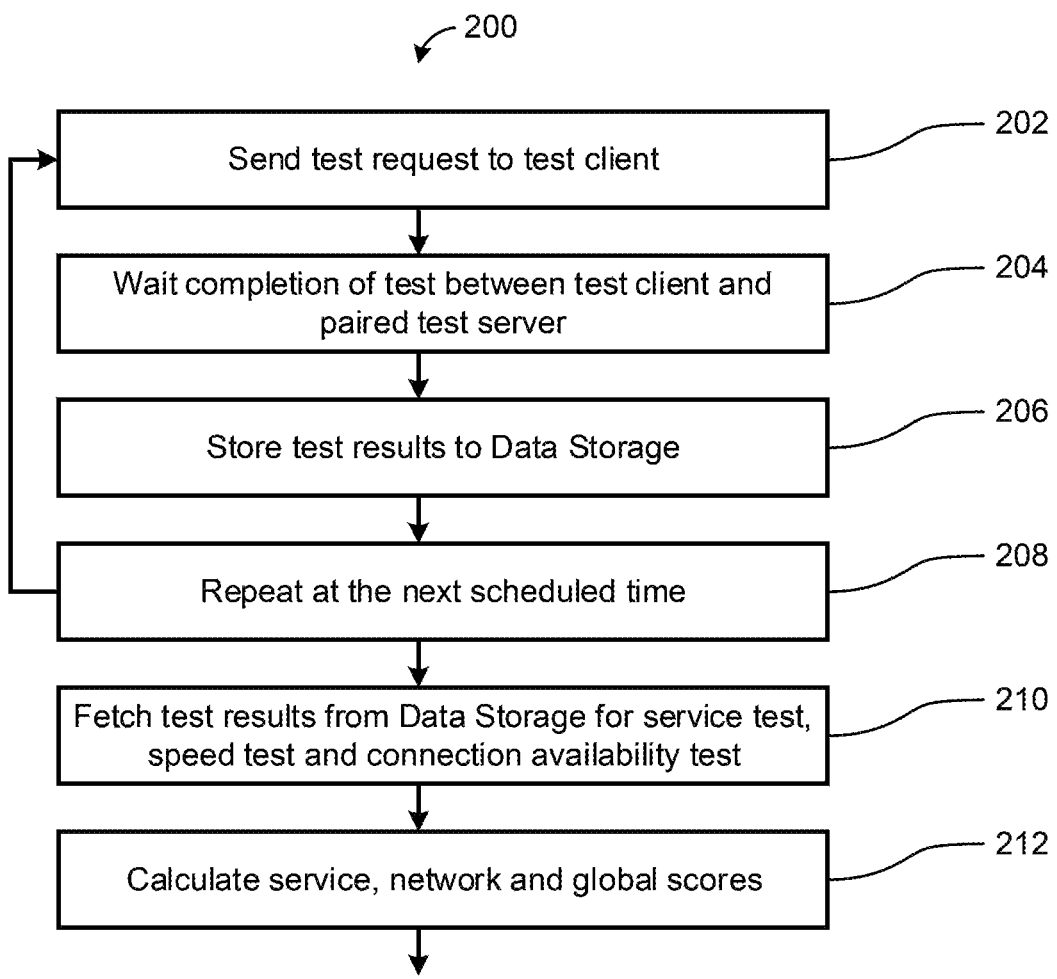
FIG. 2 is a flow chart illustrating main steps of a method for determining a network and service QoE assessment.

Now referring to FIG. 2, the method for network and services assessment 200 includes main steps to produce the service, network and global scores. A new test request is sent by the Tests Scheduler 202. The test to initiate could be the service test, the speed test or the connection availability test. The system waits for the completion of the test by the client and paired test server 204. The client initiates the communication with its respective paired server and executes the test according to the corresponding profile. Upon completion, the test results are received and stored at the Data Storage 206. The process is repeated periodically for each test, which happens in accordance to their respective schedules 208. The service test results, the speed test results and the connection availability test results accumulated in the Data Storage are fetched to be processed 210. The service, network and global scores are calculated for the reference periods 212.

Five-Star Score for Services Performance

To assess the services performance, the five-star score is calculated from Service test results in the Service score Calculator 102. RFC 6349 test or other TCP performance evaluation methodologies or tools could be used such as "iperf". When a TCP throughput test is used, three basic metrics defined for the TCP Throughput test are used: TCP Transfer Ratio, Buffer Delay and TCP Efficiency Ratio.

TCP Transfer Ratio (tcp_tra_ratio) is the actual TCP rate (actual_rate) on the ideal TCP rate (ideal_rate). See Equation A.

$$\text{tcp\_tra\_ratio} = \frac{\text{actual\_rate}}{\text{ideal\_rate}} \qquad \text{Eq. A}$$

where
ideal_rate is the rate required by the most demanding service to test
actual_rate is the measured TCP rate Buffer Delay Ratio (bd_ratio) is the increase in round-trip time (rtt) during a TCP Throughput test versus the inherent or baseline round-trip time (brtt). See Equation B.

$$\text{bd\_ratio} = 1 - \frac{rtt - brtt}{brtt} \qquad \text{Eq. B}$$

where
rtt is the round-trip time measured during TCP Throughput test
brtt is the round-trip Time inherent to the network path under non-congested conditions TCP Efficiency Ratio (tcp_eff_ratio) is the percentage of bytes that were not retransmitted. See Equation C.

$$\text{tcp\_eff\_ratio} = \frac{\text{tx\_bytes} - \text{retx\_bytes}}{\text{tx\_bytes}} \qquad \text{Eq. C}$$

where
tx_bytes is the number of bytes transmitted during the TCP Throughput test (total of original and retransmitted bytes)
retx_bytes is the number of retransmitted bytes during the TCP Throughput test The five-star score aims to reflect the QoE, which is largely function of the effective TCP transfer rate. Consequently, the main contributor to the score is the TCP Transfer Ratio parameter. Achieving a TCP transfer rate with many retransmissions and/or a significant latency increase during TCP transfer indicates non-ideal conditions. That should be reflected in the score because the QoE has a higher chance of being momentarily degraded. The TCP Buffer Delay Ratio and the TCP Efficiency Ratio parameters also contribute to the score, reflecting the robustness of the network.

The TCP Throughput test measures the TCP performance of a specific service profile. Thus, the five-star score should only grant a good or excellent score (4+ stars) when very close to the ideal rate. Small deviations of the measured rate below the ideal rate should significantly reduce the number of stars assigned. To produce the desired output, the first term of the five-star score equation is a non-linear function of the TCP Transfer Ratio based on the standard equation of a circle. The standard equation of a circle limits the good to excellent range above 98% of the TCP Transfer Ratio parameter. The two other terms of the equation are the Buffer Delay Ratio and TCP Efficiency Ratio that reduce the score proportionally to their value. See Equation 1 used to calculate the five-star score for services performance (5SSS) and see FIG. 3 for an example source code with implementation considerations. The implementation considerations include the clipping of values outside the allowed ranges.

$$5SSS = 5 * \begin{bmatrix} \left(1 - \sqrt{1 - \text{tcp\_tra\_ratio}^2}\right) - \\ 0.1 * (1 - \text{bd\_ratio}) - \\ 0.1 * (1 - \text{tcp\_eff\_ratio}) \end{bmatrix} \qquad \text{Eq. 1}$$

The five-star score for services performance is distributed as shown in Table 1. In the example of Table 1, when Buffer Delay Ratio=100%, TCP Efficiency Ratio=100%.

TABLE 1

| TCP Transfer Ratio expressed in % | Five-star score for services performance (5SSS) |
| --- | --- |
| 60%− | 0 - Non-functional |
| 60%+ | 1 - Bad |
| 80%+ | 2 - Poor |
| 92%+ | 3 - Fair |
| 98%+ | 4 - Good |
| 100% | 5 - Excellent |

Five-Star Score for Network Performance

To assess the network performance, the five-star score is calculated from the speed test and connection availability test results in the Network score Calculator 104. The speed test may use TCP transfers. The objective is to determine the maximum speed of the network connection, not the TCP performance for a specific service profile. Thus, the ideal rate corresponds to the expected upload or download speed of the network connection. The expected upload or download can be explicitly set or calculated from the average of the results from the last 24 hours. Other reference periods could be used such as 1 week, 1 month or 1 year.

The network performance assessment is different from the service performance assessment. Getting a slightly lower than expected network connection throughput does not have as much of an impact as a service expecting a specific rate to operate properly. Thus, a linear function is used to calculate the five-star score from the TCP Transfer Ratio. In that sense the throughput score for the network is considered to be a speed score. The five-star score related to the speed is calculated individually for the upload and download. See Equation 2 used to calculate the five-star speed network score for network speed performance for upload and download (5SSN_TP$_{UL}$, 5SSN_TP$_{DL}$). See FIG. 4 for an example source code with implementation considerations.

$$5SSN\_TP_{UL\ or\ DL} = 5 * \left[ \frac{tcp\_tra\_ratio - 0.1 * (1 - bd\_ratio) -}{0.1 * (1 - tcp\_eff\_ratio)} \right] \quad \text{Eq. 2}$$

Then, the global network speed performance (5SSN_TP) result is the minimum of the score calculated for download and upload. See Equation 3 used to calculate the 5SSN_TP. See FIG. 5 for an example source code with implementation considerations.

$$5SSN\_TP = \min\ [5SSN\_TP_{UL}, 5SSN\_TP_{DL}] \quad \text{Eq. 3}$$

The connection availability test monitors the network availability at regular intervals. It may be carried out using TWAMP tests. There is no TCP transfer in this case as TWAMP is running over UDP packets. The TWAMP test reports the outbound and inbound latency, jitter and packet loss.

Figure 6:
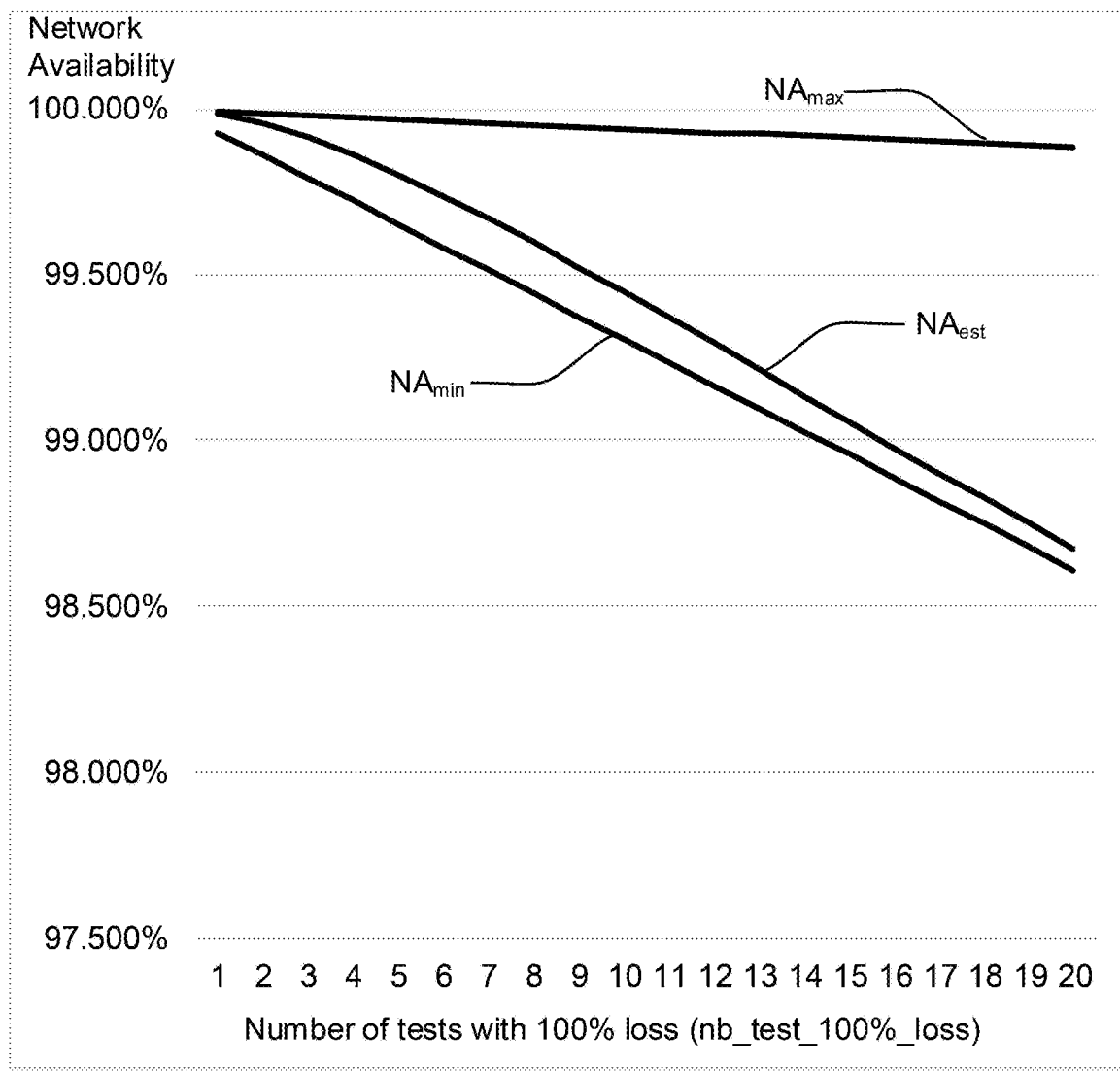
FIG. 6 is a graph showing an example of network availability curves.

The network availability is assessed based on the presence of packet loss. When 100% of the packets are lost, the network is considered down. Otherwise, the network is up even if some packet losses are reported. The methodology is to run TWAMP test for a short duration at regular intervals. Different monitoring ratios and periodicities could be used as controlled by the Test Scheduler 111. For example, the TWAMP test could be executed every minute for 5 seconds. This is a monitoring ratio of 0.083 (5 seconds/60 seconds) with a periodicity of 1 minute. Thus, the network is monitored 8% of the time, which is a tradeoff between constant monitoring and regular monitoring to assess network availability. This approach introduces an error on the network availability estimation proportional to the number of TWAMP test with 100% of packet loss. For each test with 100% packet loss, the real downtime could be anywhere between 5 seconds and 1 minute. Therefore, the estimated network availability is bounded by the min and max scenarios, the pessimistic and optimistic scenarios, respectively. An exponential distribution is used to start from the optimistic scenario to converge quickly to the pessimistic scenario as more TWAMP tests with 100% of packet loss are occurring within one day. Other periods could be used. When multiple tests with 100% packet loss are reported, there are more chances that the network downtimes become longer than 5 seconds. Essentially, the probability of having a downtime longer that 5 second is increasing exponentially with the number of occurrences. See FIG. 6 for an illustration of the network availability estimation methodology.

The network availability estimation is calculated for 24-hour periods (moving window). Other time periods could be used. The cumulative distribution function of the exponential distribution allows for an optimistic interpretation when few occurrences with 100% packet loss occur and to become quickly pessimistic when this scenario increases. Equation 4 is used to calculate the network availability pessimistic scenario (NA$_{min}$), Equation 5 is used to calculate the network availability optimistic scenario (NA$_{max}$) and Equation 6 is used to calculate the network availability estimation (NA$_{est}$). See FIG. 7 for an example source code with implementation considerations.

$$NA_{min} = 1 - \frac{nb\_test\_100\%\_loss}{nb\_test} \quad \text{Eq. 4}$$

$$NA_{max} = 1 - mon\_ratio * \frac{nb\_test\_100\%\_loss}{nb\_test} \quad \text{Eq. 5}$$

where $$mon\_ratio = \frac{test\_duration}{test\_interval}$$

$$NA_{est} = NA_{min} + (NA_{max} - NA_{min}) * (1 - P(X \le x)) \quad \text{Eq. 6}$$

where $$P(X \le x) = 1 - e^{-\lambda x},$$

$$\lambda = \frac{1}{6},$$

$$x = \frac{nb\_test\_100\%\_loss}{nb\_test}$$

The network availability estimation contributes to the network performance assessment. Losing network access is a major problem impacting the user directly, even if it is for a short duration. Thus, the five-star score related to the network availability (5SSN_NA) is derived from the number of 9s counted in the network availability estimation and is shown in Table 2. In the example case of Table 2, a monitoring ratio of 0.083 (5 seconds/60 seconds) with a periodicity of 1 minute is used.

TABLE 2

| Number of tests with 100% loss (nb_test_100%_loss) | Network Availability estimation (NAest) | Theoretical Down time in 24 hours | Five-star score for network performance related to network availability (5SSN_NA) |
|---|---|---|---|
| More than 144 (more than 2 h 24 m) | <90% | >2.4 hours | 0 - Non-functional |
| 20 to 144 (100 s to 2 h 24 m) | ≥90% | <2.4 hours | 1 - Bad |
| 5 to 19 (25 s to 19 m) | ≥99% | <14.4 minutes | 2 - Poor |
| 2 to 4 (10 s to 4 m) | ≥99.9% | <1.44 minutes | 3 - Fair |
| 1 (5 s to 1 m) | ≥99.99% | <8.64 seconds | 4 - Good |
| 0 | ≥99.999% | <0.864 seconds | 5 - Excellent |

The connection availability also includes a loss and latency component in addition to the network availability component. The TWAMP test outbound and inbound latency and packet loss metrics also contribute to the network performance assessment. For each metric, the worst result from the inbound and outbound test is used. The five-star score related to the loss and latency (5SSN_TM) is primarily function of the percentage of packet loss obtained by a TWAMP test. A small increase in the packet loss percentage should significantly reduce the number of stars granted. To produce this behavior, the first term of the five-star score equation is a non-linear function of the packet loss ratio based on the standard equation of a circle. The other term of the equation is the latency penalty. The portion of latency value above the latency threshold (for example 10 ms) proportionally reduces the score. See Equation 7 used to calculate the five-star score for network performance related to loss and latency (5SSN_TM) and see FIG. 8 for an example source code with implementation considerations.

$$5SSN\_TM = 5*\left[\left(1-\sqrt{1-(1-\text{loss\_ratio})^2}\right)-0.1*\left(1-\frac{\text{latency}-\text{latency}_{th}}{\text{latency}_{th}}\right)\right] \quad \text{Eq. 7}$$

The five-star score for network performance is calculated for 24-hour periods (moving window). Other periods could be used. It corresponds to the minimum of the 5SSN_TP, 5SSN_NA and 5SSN_TM. See Equation 8 used to calculate the five-star score for network performance (5SSN) and see FIG. 9 for an example source code with implementation considerations.

$$5SSN=\min [5SSN\_TP, 5SSN\_NA, 5SSN\_TM] \quad \text{Eq. 8}$$

Five-Star Score for Global Performance

The five-star score combining network and services performance is calculated from the minimum of the service and network scores in the Global score Calculator 106. See Equation 9 used to calculate the global five-star score and see FIG. 10 for an example source code with implementation considerations.

$$5SS=\min [5SSS, 5SSN] \quad \text{Eq. 9}$$

User Interface Example

A practical example implementation of a user interface for the methods and systems described herein is shown in FIGS. 11 to 17. An example application labelled Test App provides a user interface 108 for displaying data acquired by the network and service QoE assessment method and system of the present disclosure to a user. FIGS. 11 to 16 show screenshots of the example user interface for different example pages or states.

Figure 11:
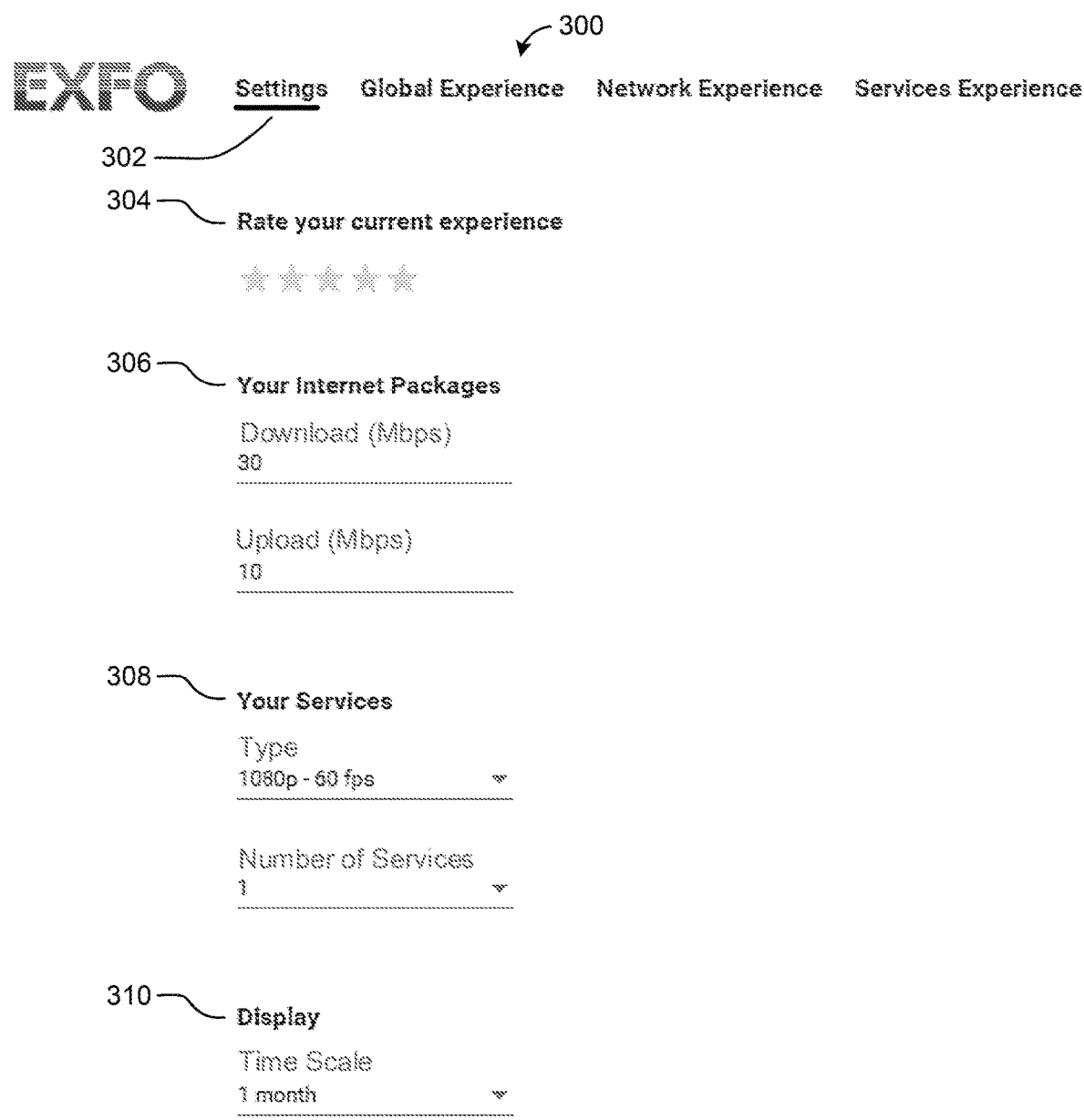
FIG. 11 shows a screenshot for an example application labelled Test App which provides the network and service QoE assessment method and system of the present disclosure in which the Settings page is apparent.

FIG. 11 shows a screenshot 300 in which the Settings page 302 is apparent. In the Settings page 302, the user can rate his experience 304, provide the Download and Upload speeds of his internet package as advertised by the Internet Service Provider (ISP) 306, set the type and number of the targeted services 308 and provide a timescale 310 for the display of results. The experience rating 304 can be compared to the global score calculated by the global score calculator 106. The Download and Upload speeds 306 correspond to the ideal TCP rate values in Equation A. They are used by the Network Score Calculator 104 to calculate the TCP Transfer ratio, which is then used in Equation 2 to calculate the five-star score for network speed performance for upload and download (5SSN_TP$_{UL}$, 5SSN_TP$_{DL}$). The type and number of the targeted services 308 are used by Profile Selector 110 to determine the test parameters for the TCP Throughput Test Client 112. They are also used by the Service Score Calculator 102 to calculate the TCP Transfer ratio, which is then used in Equation 1 to calculate the five-star score for services performance (5SSS). The ideal TCP rate value used in Equation A corresponds to the targeted service required rate multiplied by the number of instances. The timescale 310 for the display of results is used by the user interface 108 for adjusting the reference period presented.

Figure 12:
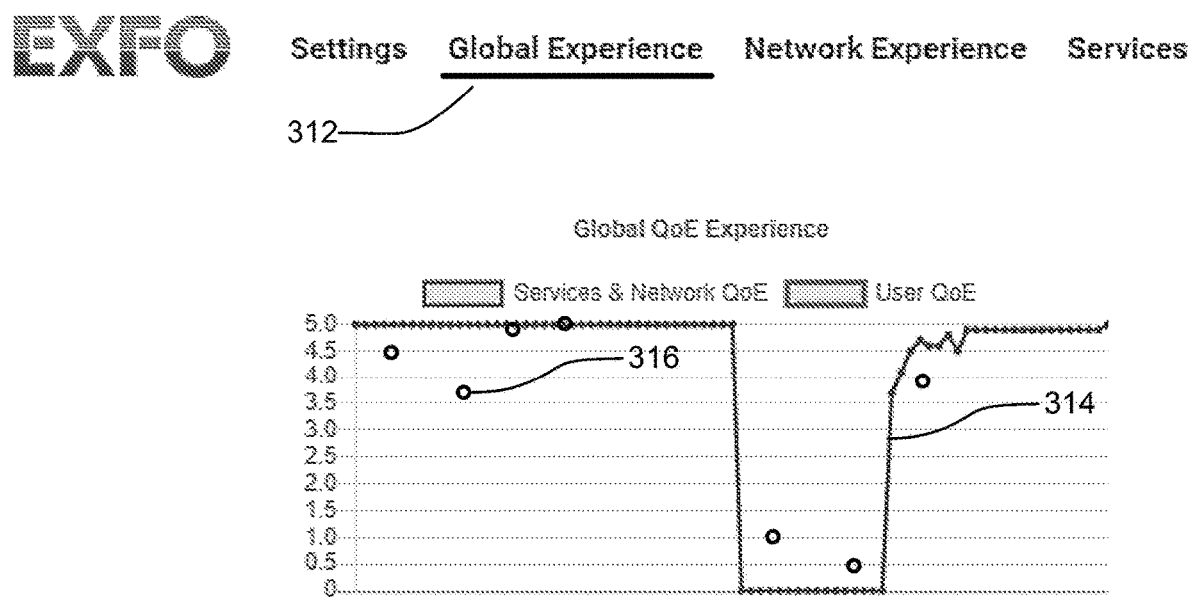
FIG. 12 shows the example Test App of FIG. 11 in which the Global Experience page is apparent.

FIG. 12 shows the example Test App of FIG. 11 in which the Global Experience page 312 is apparent. The Global QoE Experience score combines the network and service performance into a global five-star score. A curve 314 is provided in the timescale 310 indicated in the Setting page. Optionally, the User's own Quality of Experience (QoE) score 316 can optionally be displayed.

Figure 13:
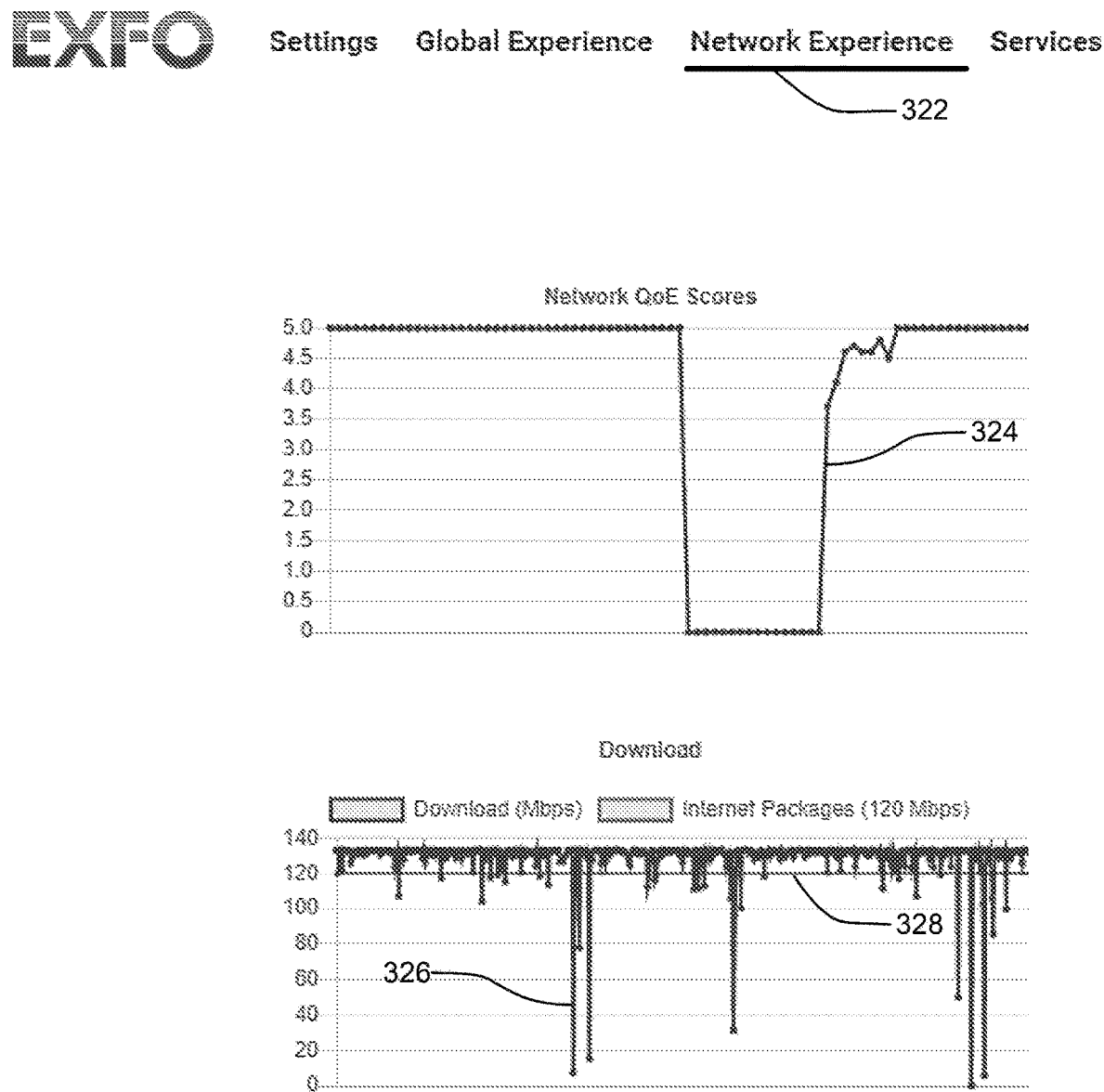
FIG. 13 shows the example Test App of FIG. 11 in which the top third of the Network Experience page is apparent.

FIG. 13 shows the example Test App of FIG. 11 in which the top third of the Network Experience page 322 is apparent. It includes two graphs, one showing the score for the network experience 324, obtained from the speed test and connection availability results, and one showing the speed test download results 326 compared to the download speed advertised by the ISP 328.

Figure 14:
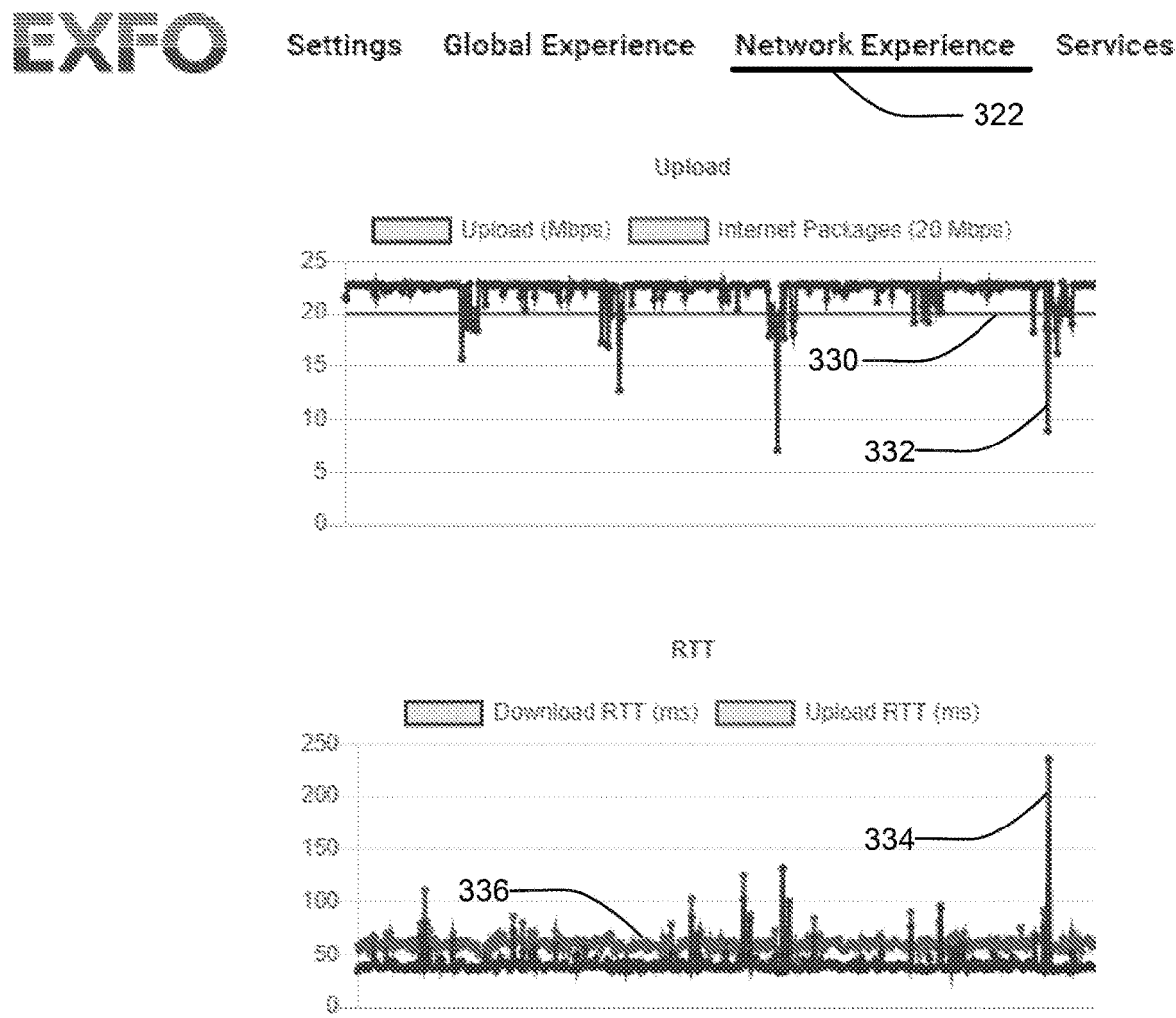
FIG. 14 shows the example Test App of FIG. 11 in which the middle third of the Network Experience page is apparent.

FIG. 14 shows the example Test App of FIG. 11 in which the middle third of the Network Experience page 322 is apparent. Two graphs are shown: the speed test upload results 330 compared to the upload speed promised by the ISP 332 and the speed test Round-Trip Time (RTT) results for the download 334 and the upload 336.

Figure 15:
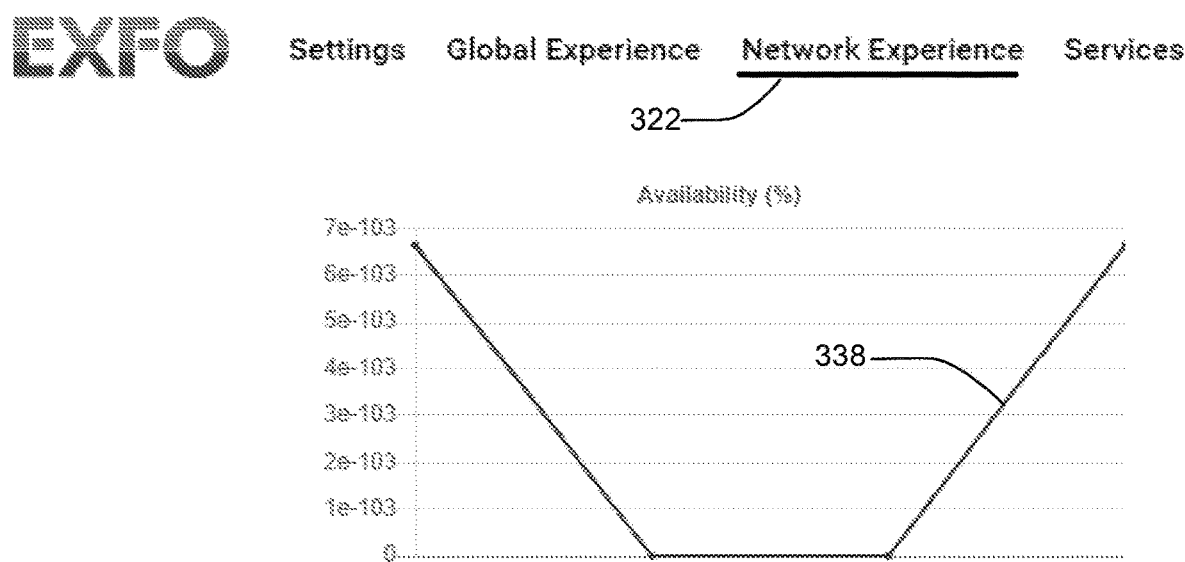
FIG. 15 shows the example Test App of FIG. 11 in which the bottom third of the Network Experience page experience page is apparent.

FIG. 15 shows the example Test App of FIG. 11 in which the bottom third of the Network Experience page 322 is apparent. The Availability 338 obtained from the TWAMP tests is displayed.

Figure 16:
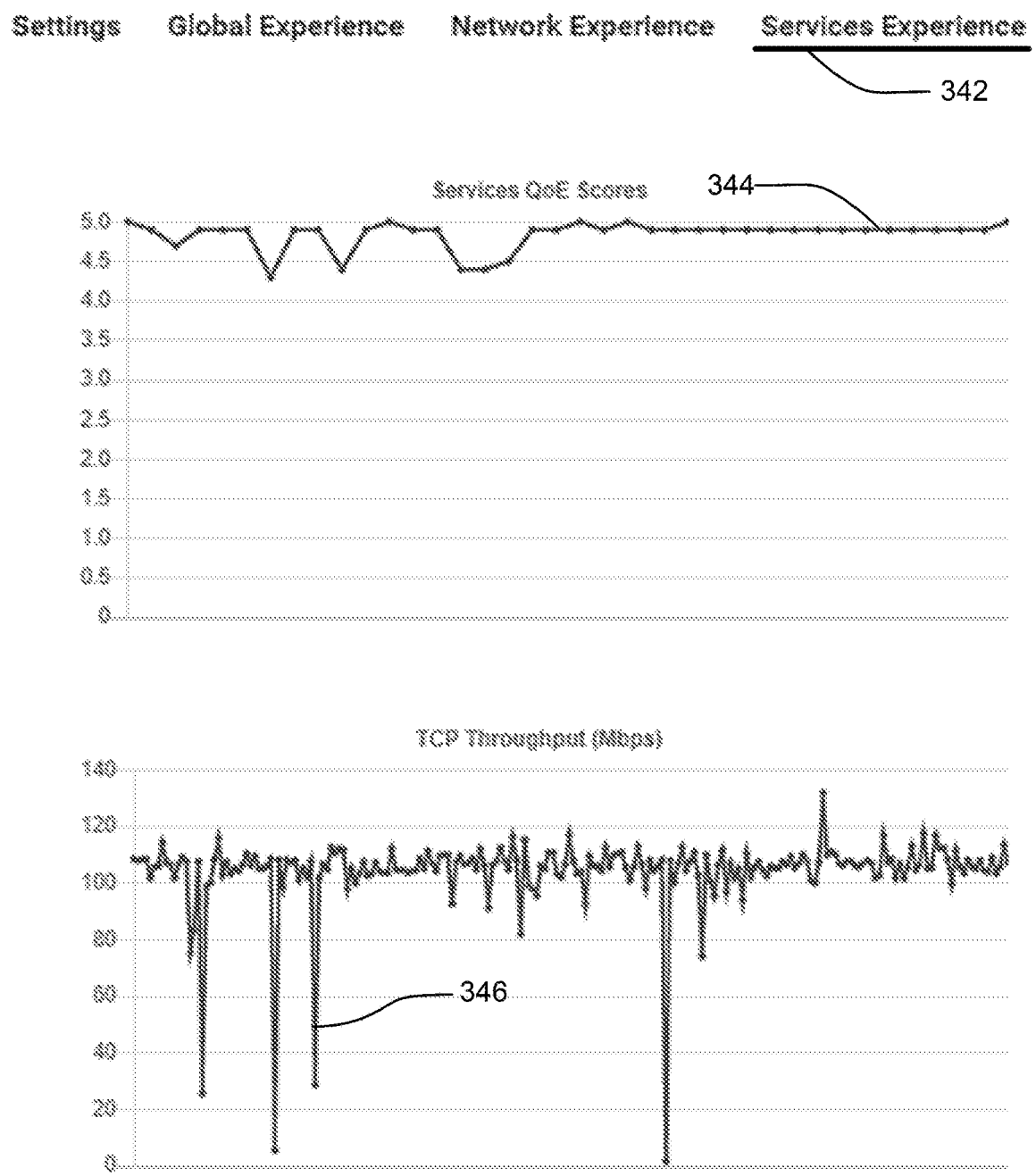
FIG. 16 shows the example Test App of FIG. 11 in which the Services Experience page is apparent.

FIG. 16 shows the example Test App of FIG. 11 in which the Services Experience page 342 is apparent. The Services score 344 is displayed as obtained from the TCP Throughput tests. In this example, RFC6349 test results 346 are shown.

Figure 17:
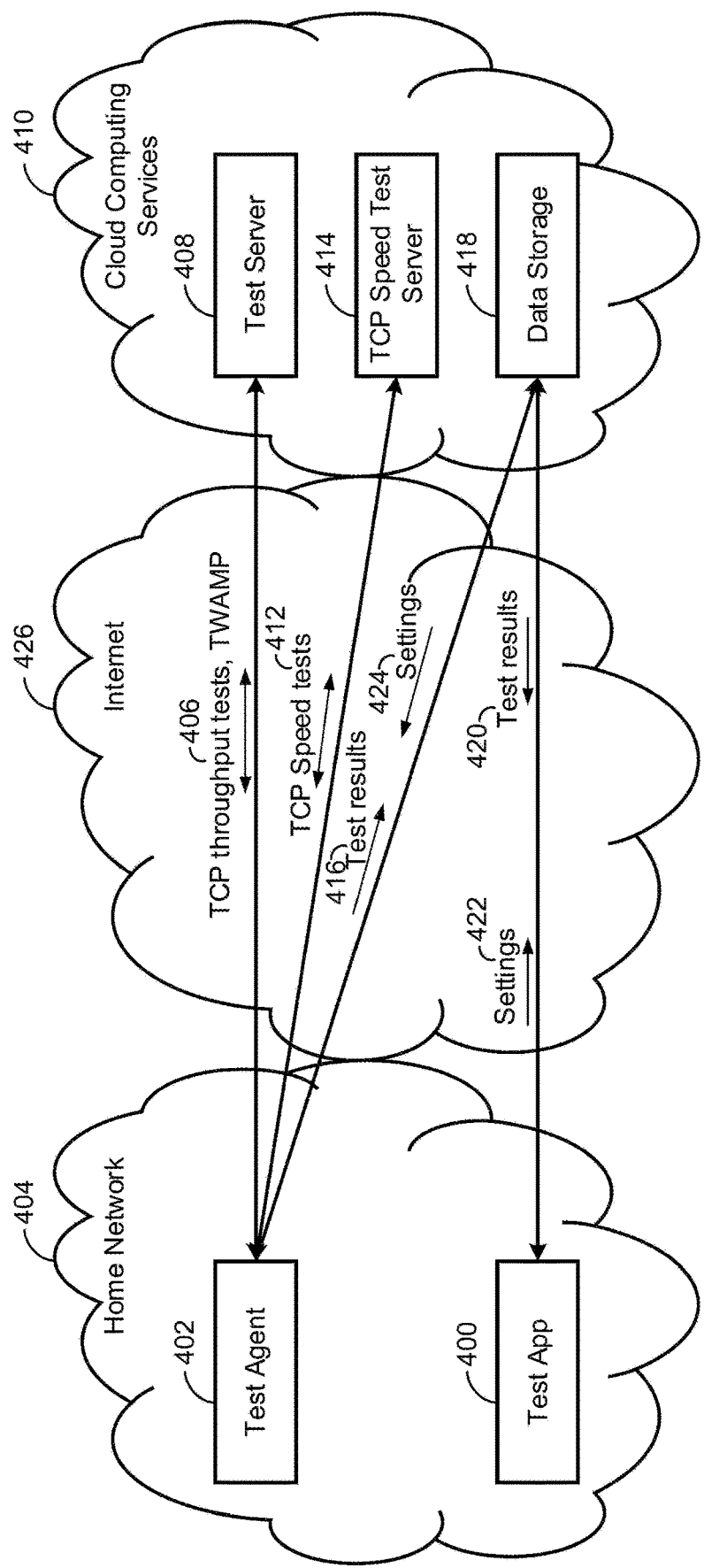
FIG. 17 shows a block diagram of the environment in which an example application labelled Test App operates.

FIG. 17 shows a block diagram of the environment in which the example Test App 400 operates. One or multiples Test Agents 402 deployed on devices in a Home Network 404, or in other types of network, perform tests 406 with a Test Server 408 hosted in a cloud computing services infrastructure 410 and TCP speed tests 412 with an TCP Speed Test server 414. Test results 416 are transferred to a Data Storage entity 418. The Test App 400 gets tests results 420 from the Data storage entity 418. The Settings 422 from the Test App 400 are pushed to the Data storage entity 418 and the Settings 424 are relayed to the Test Agent 402. Communication between the Home Network 404 and the Cloud Computing Services 410 are via Internet 426 or mobile networks.

Simplified Example Embodiment

Figure 18:
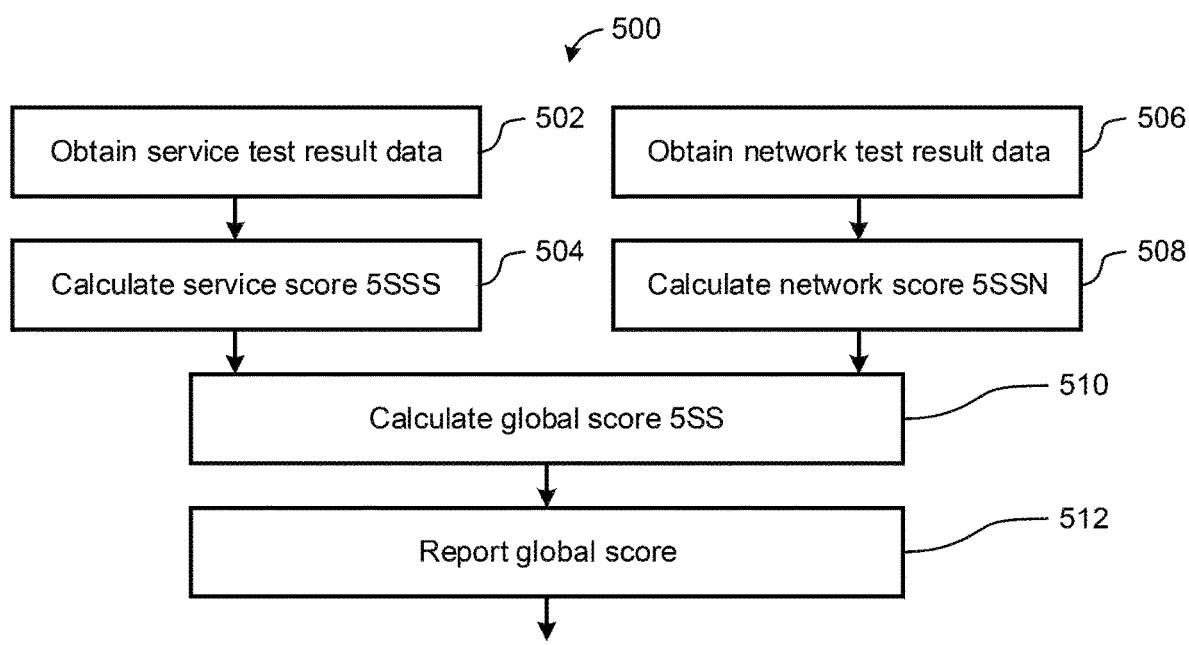
FIG. 18 is a flow chart illustrating main steps of a simplified method for determining a network and service QoE assessment.

FIG. 18 is a flow chart illustrating main steps of a simplified method 500 for determining a network and service QoE assessment. In order to calculate a global score SSS for a quality of experience of a user on a network 510 and report this global score via a user interface 512, the method first calculates a service score 5SSS 504 and a network score 5SSN 508. In order to calculate the service score 5SSS 504, service test result data are first obtained 502. The service test result data include test results from tests performed by test entities. In order to calculate the network score 5SSN 508, network test result data are first obtained 506. The network test result data include test results from tests performed by test entities.

When the method is provided as computer readable code for programming a network and service assessment system, it can be stored on a non-transitory computer-readable storage medium.

In one embodiment, the global score 5SS is calculated from the minimum of the service score 5SSS and the network score 5SSN.

In one embodiment, the service test result data are TCP Throughput test results obtained by a TCP Throughput test as the active test. Example TCP Throughput tests include RFC6349 test.

Figure 19:
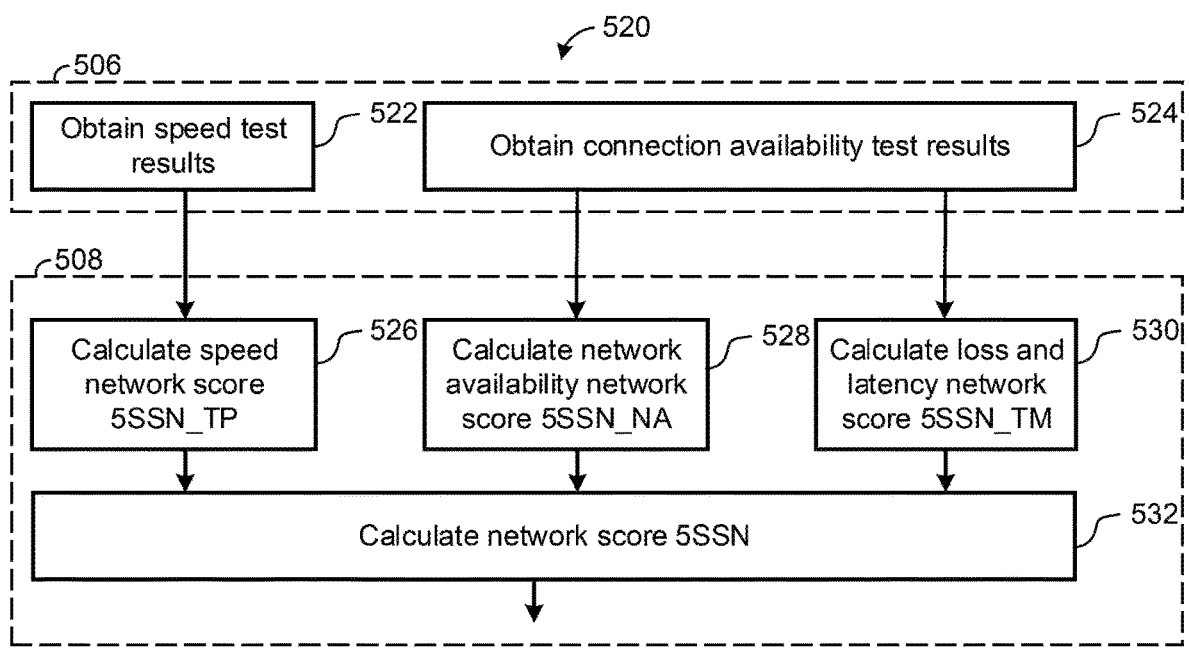
FIG. 19 is a flow chart illustrating optional sub-steps of the network score calculation of FIG. 18.

With reference to FIG. 19, in one embodiment, the network test result data are speed and connection availability test results obtained from network availability tests 506. In one embodiment, the network availability tests include a TCP Speed test for the speed test and a TWAMP test for the connection availability test. The network test result data may include download speed, upload speed and ping data obtained from the TCP speed test and may include latency, jitter and loss data obtained from the TWAMP test.

Obtaining the network test result data 506 includes obtaining speed test results 522 which allow to calculate a Speed Network Score (5SSN_TP) 526 and obtaining connection availability test results 524 which allow to calculate a Network Availability network score (5SSN_NA) 528 and a Loss and Latency network score (5SSN_TM) 530.

The network score is calculated using the Speed Network Score (5SSN_TP), the Network Availability network score (5SSN_NA) and the Loss and Latency network score (5SSN_TM) 532.

In one embodiment, the network score (5SSN) is calculated by performing the speed test at a first frequency to obtain speed test results 522 and performing the connection availability test at a second frequency to obtain connection availability test results 524, the second frequency being greater (more frequent) than the first frequency. The network test result data includes historical data for instances of the speed test and connection availability test.

Figure 20:
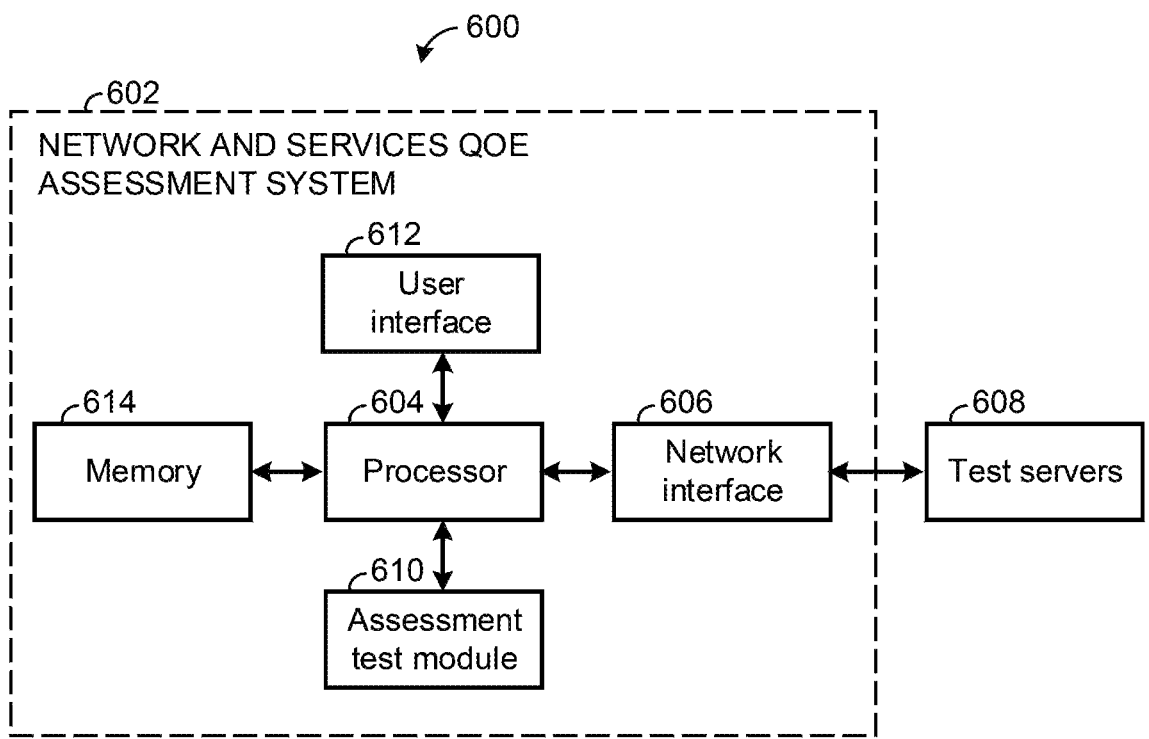
FIG. 20 is a block diagram showing the main components of a simplified system for network and service QoE assessment.

With reference to FIG. 20, the environment 600 in which a testing device functions is illustrated. A network and service assessment QoE system 602 is shown which includes a network interface 606 communicatively coupled to one or more test clients 608 each comprising a test server and a processing device, to test a network with the test server; a processor 604 communicatively coupled to the network interface 606 and configured to receive test results from the at least one test client 608; memory 614 storing instructions that, when executed, cause the processor 604 to a) obtain test results, via the network interface 606, from the one or more test client 608 from the test of the network; b) execute a network and service QoE assessment test module 610 for automated post-processing on the test results to calculate a service score, a network score and a global score, the global score being calculated from the service score and the network score; and c) cause a user interface 612 to report at least the global score.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

The invention claimed is:

1. A non-transitory computer-readable storage medium having computer readable code stored thereon for programming a network and service assessment system to perform the steps of:
    obtaining service test result data from one or more first active tests on a network at a transport layer to estimate Quality of Experience (QoE) of a service instead of monitoring or emulating the service;
    processing the service test result data to calculate a service score;
    obtaining network test result data from one or more second active tests on the network that are different from the one or more first active tests;
    processing the network test result data to calculate a network score;
    processing the service score and the network score to calculate a global score for a quality of experience of a user on the network; and
    causing a user interface to report at least the global score.

2. The storage medium as claimed in claim 1, wherein the service score, the network score and the global score are each provided as numerical values between 0 and 5 and labelled respectively service five-star score, network five-star score and global five-star score and wherein a 0 value is labelled "Non-functional", a 1 value is labelled "Bad", a 2 value is labelled "Poor", a 3 value is labelled "Fair", a 4 value is labelled "Good" and a 5 value is labelled "Excellent".

3. The storage medium as claimed in claim 1, wherein the global score (5SS) is calculated by:

$$5SS = \min[5SSS, 5SSN]$$

where
    5SSS is the service score;
    5SSN is the network score.

4. The storage medium as claimed in claim 1, wherein the one or more first active tests are a TCP Throughput test and wherein the service test result data is TCP Throughput test results and wherein the TCP Throughput test is a RFC6349 test.

5. The storage medium as claimed in claim 4, wherein the service score (5SSS) is calculated by:

$$5SSS = 5 * \begin{bmatrix} \left(1 - \sqrt{1 - \text{tcp\_tra\_ratio}^2}\right) - \\ 0.1 * (1 - \text{bd\_ratio}) - \\ 0.1 * (1 - \text{tcp\_eff\_ratio}) \end{bmatrix}$$

where
TCP transfer ratio:

$$\text{tcp\_tra\_ratio} = \frac{\text{actual\_rate}}{\text{ideal\_rate}};$$

Buffer delay ratio:

$$\text{bd\_ratio} = 1 - \frac{\text{rtt\_brtt}}{\text{brtt}};$$

TCP efficiency ratio:

$$\text{tcp\_eff\_ratio} = \frac{\text{tx\_bytes} - \text{retx\_bytes}}{\text{tx\_bytes}};$$

ideal_rate is a rate required by a most demanding service to test;
actual_rate is a measured TCP rate;
rtt is a round-trip time measured during the TCP Throughput test;
brtt is a round-trip time inherent to a network path under non-congested conditions;
tx_bytes is a number of bytes transmitted during the TCP Throughput test, said tx_bytes being a total of a number of original bytes and a number of retransmitted bytes;
retx_bytes is the number of retransmitted bytes during the TCP Throughput test.

6. The storage medium as claimed in claim 1, wherein the one or more second active tests are at least one of a speed test and a connection availability test and wherein the network score (5SSN) is calculated using network test result data obtained from the active test.

7. The storage medium as claimed in claim 6, wherein the network score (5SSN) is calculated by performing the speed test at a first frequency and performing the connection availability test at a second frequency, wherein the second frequency is greater than the first frequency and wherein the network test result data includes historical data for instances of the speed test and connection availability test.

8. The storage medium as claimed in claim 6, wherein the speed test is a TCP Speed test and the connection availability test is a TWAMP test and wherein the network test result data includes download speed, upload speed and ping data obtained from the TCP speed test and includes latency, jitter and loss data obtained from the TWAMP test.

9. The storage medium as claimed in claim 8, wherein the network score (5SSN) is calculated by:

$$5SSN = \min[5SSN\_TP, 5SSN\_NA, 5SSN\_TM]$$

where
    5SSN_TP is a speed network score calculated using network test result data obtained from the TCP speed test;
    5SSN_NA is a Network Availability network score calculated using network test result data obtained from the TWAMP test; and
    5SSN_TM is a Loss and Latency network score calculated using network test result data obtained from the TWAMP test.

10. The storage medium as claimed in claim 9, wherein the TCP Speed test includes an upload TCP Speed test and a download TCP Speed test and processing the network test result data includes calculating the speed network score, 5SSN_TP, which includes an upload TCP speed network score, $5SSN\_TP_{UL}$, and a download speed network score, $5SSN\_TP_{DL}$, and wherein the upload speed network score and the download TCP speed network score are calculated using a TCP transfer ratio, a Buffer delay ratio and a TCP efficiency ratio.

11. The storage medium as claimed in claim 10, wherein the speed network score (5SSN_TP) is calculated from an upload speed network score ($5SSN\_TP_{UL}$) and a download speed network score ($5SSN\_TP_{DL}$) by:

$$5SSN\_TP = \min[5SSN\_TP_{UL}, 5SSN\_TP_{DL}] \text{ where}$$

$$5SSN\_TP_{UL} = 5 * \left[ \frac{\text{tcp\_tra\_ratio} - 0.1 * (1 - \text{bd\_ratio}) -}{0.1 * (1 - \text{tcp\_eff\_ratio})} \right];$$

$$5SSN\_TP_{DL} = 5 * \left[ \frac{\text{tcp\_tra\_ratio} - 0.1 * (1 - \text{bd\_ratio}) -}{0.1 * (1 - \text{tcp\_eff\_ratio})} \right];$$

$$tcp_{tra_{ratio}} = \frac{actual_{rate}}{ideal_{rate}};$$

$$\text{bd\_ratio} = 1 - \frac{rtt - brtt}{brtt};$$

$$\text{tcp\_eff\_ratio} = \frac{\text{tx\_bytes} - \text{retx\_bytes}}{\text{tx\_bytes}};$$

ideal_rate is the expected upload or download speed of the network connection;
actual_rate is a measured TCP rate;
rtt is a round-trip time measured during the TCP Speed test;
brtt is a round-trip time inherent to the network path under non-congested conditions;
tx_bytes is a number of bytes transmitted during the TCP Speed test (total of original and the retransmitted);
retx_bytes is the number of retransmitted bytes during the TCP Speed test.

12. The storage medium as claimed in claim 9, wherein calculating the Network Availability network score (5SSN_NA) includes calculating an estimated network availability $NA_{est}$ from a minimum network availability $NA_{min}$ and maximum network availability $NA_{max}$ by:

$$NA_{est} = NA_{min} + (NA_{max} - NA_{min}) * (1 - P(X \leq x))$$

where $$NA_{min} = 1 - \frac{\text{nb\_test\_100\%\_loss}}{\text{nb\_test}};$$

$$NA_{max} = 1 - \text{mon\_ratio} * \frac{\text{nb\_test\_100\%\_loss}}{\text{nb\_test}};$$

$$\text{mon\_ratio} = \frac{\text{test\_duration}}{\text{test\_interval}};$$

nb_test_100%_loss is a number of TWAMP tests with 100% of packet loss;
nb_test is a number of TWAMP tests during the reference period;
test_duration is a duration of a TWAMP test;
test_interval is a time between the execution of consecutive TWAMP tests;

$$P(X \leq x) = 1 - e^{-\lambda x},$$

$$\lambda = 1/6,$$

$$x = \frac{\text{nb\_test\_100\%\_loss}}{\text{nb\_test}}.$$

13. The storage medium as claimed in claim 12, wherein the Network Availability network score (5SSN_NA) is given by:

$$5SSN\_NA = \begin{cases} 5, \text{ if } NA_{est} \geq 99.999\% \\ 4, \text{ if } NA_{est} \geq 99.99\% \\ 3, \text{ if } NA_{est} \geq 99.9\% \\ 2, \text{ if } NA_{est} \geq 99\% \\ 1, \text{ if } NA_{est} \geq 90\% \\ 0, \text{ if } NA_{est} < 90\% \end{cases}.$$

14. The storage medium as claimed in claim 9, wherein the Loss and Latency network score (5SSN_TM) is calculated by:

$$5SSN\_TM = 5 * \left[ \left( 1 - \sqrt{1 - (1 - \text{loss\_ratio})^2} \right) - 0.1 * \left( 1 - \frac{\text{latency} - \text{latency}_{th}}{\text{latency}_{th}} \right) \right]$$

where
loss_ratio is a maximum of an outbound and inbound packet loss on a number of transmitted packets;
latency is a maximum of an outbound round-trip latency and an inbound round-trip latency;
$\text{latency}_{th}$ is a latency threshold used to apply a penalty on the network score.

15. A network and service assessment system comprising:
a network interface communicatively coupled to one or more test clients each comprising a test server and a processing device, to test a network with the test server;
a processor communicatively coupled to the network interface and configured to receive test results from the one or more test clients;
memory storing instructions that, when executed, cause the processor to:
obtain test results, via the network interface, from the one or more test clients from the test of the network;
execute a network and service Quality of Experience (QoE) assessment test module for automated post-processing on the test results to calculate a service score from first test results of the test results, a network score from second test results of the test results different from the first test results, and a global score, the global score being calculated from the service score and the network score, wherein the first test results are from active tests at a transports layer to estimate QoE of a service instead of monitoring or emulating the service; and
cause a user interface to report at least the global score.

16. The storage medium as claimed in claim 1, wherein the one or more first active tests are a TCP Throughput test and wherein the service test result data is TCP Throughput test results and wherein the TCP Throughput test is a RFC6349 test, and
wherein the one or more second active tests are at least one of a speed test and a connection availability test and wherein the network score (5SSN) is calculated using network test result data obtained from the active test.

17. The storage medium as claimed in claim 1, wherein the one or more first active tests and the one or more second active tests are performed at different times.

18. The storage medium as claimed in claim 1, wherein the one or more first active tests are performed before starting to use the service.

19. The storage medium as claimed in claim 1, wherein the one or more first active tests and the one or more second active tests are any of TCP throughput tests, TCP speed tests, and TWAMP tests.

20. The storage medium as claimed in claim 19, wherein the service test result data and the network test result data are determined from the any of TCP throughput tests, TCP speed tests, and TWAMP tests.

\* \* \* \* \*